Figure 1:
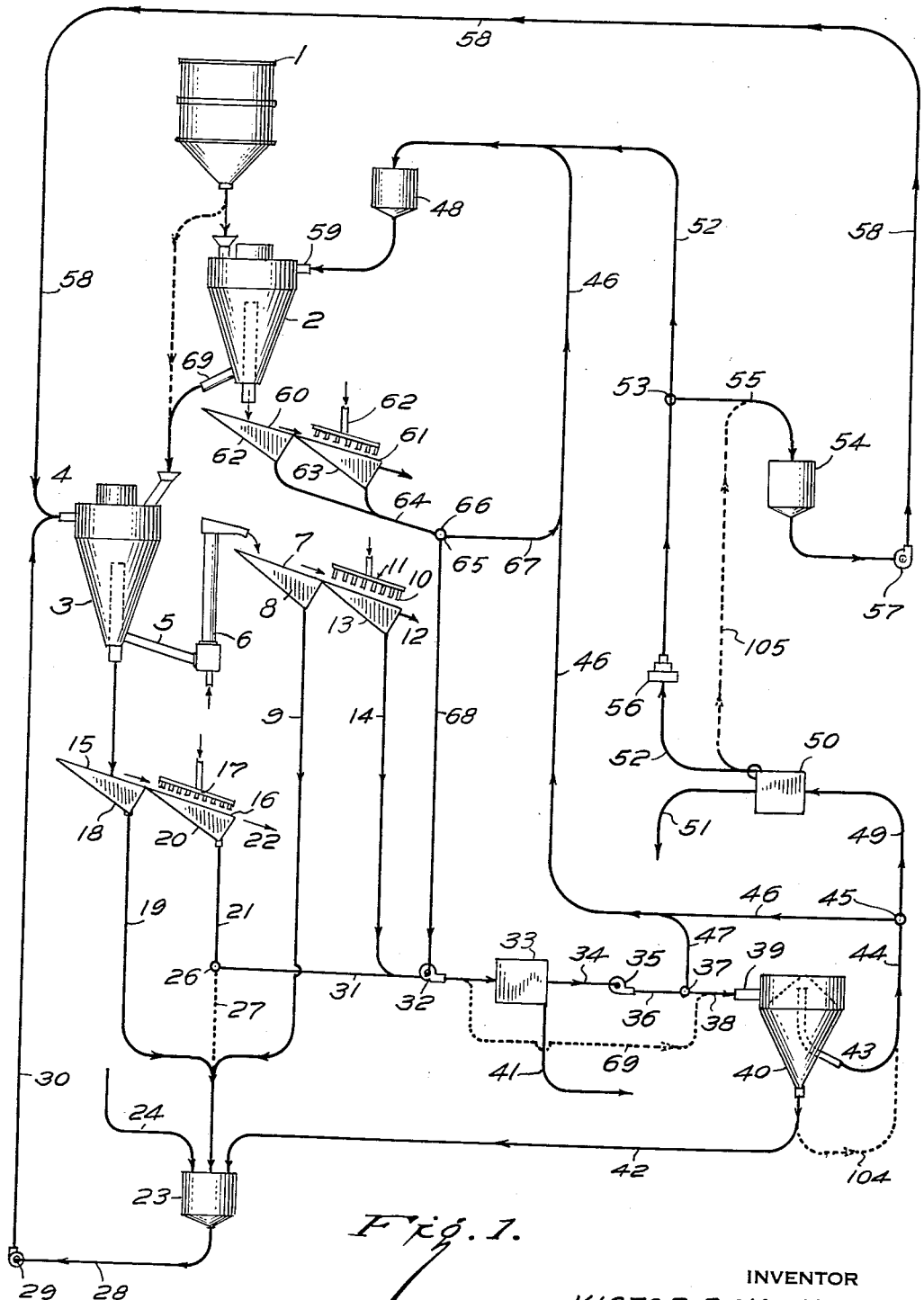

Dec. 13, 1955 V. RAKOWSKY 2,726,763
METHOD OF GRAVITY SEPARATION
Filed Aug. 14, 1951 2 Sheets-Sheet 1

INVENTOR
VICTOR RAKOWSKY,
ATTORNEY

Dec. 13, 1955  V. RAKOWSKY  2,726,763
METHOD OF GRAVITY SEPARATION
Filed Aug. 14, 1951  2 Sheets-Sheet 2
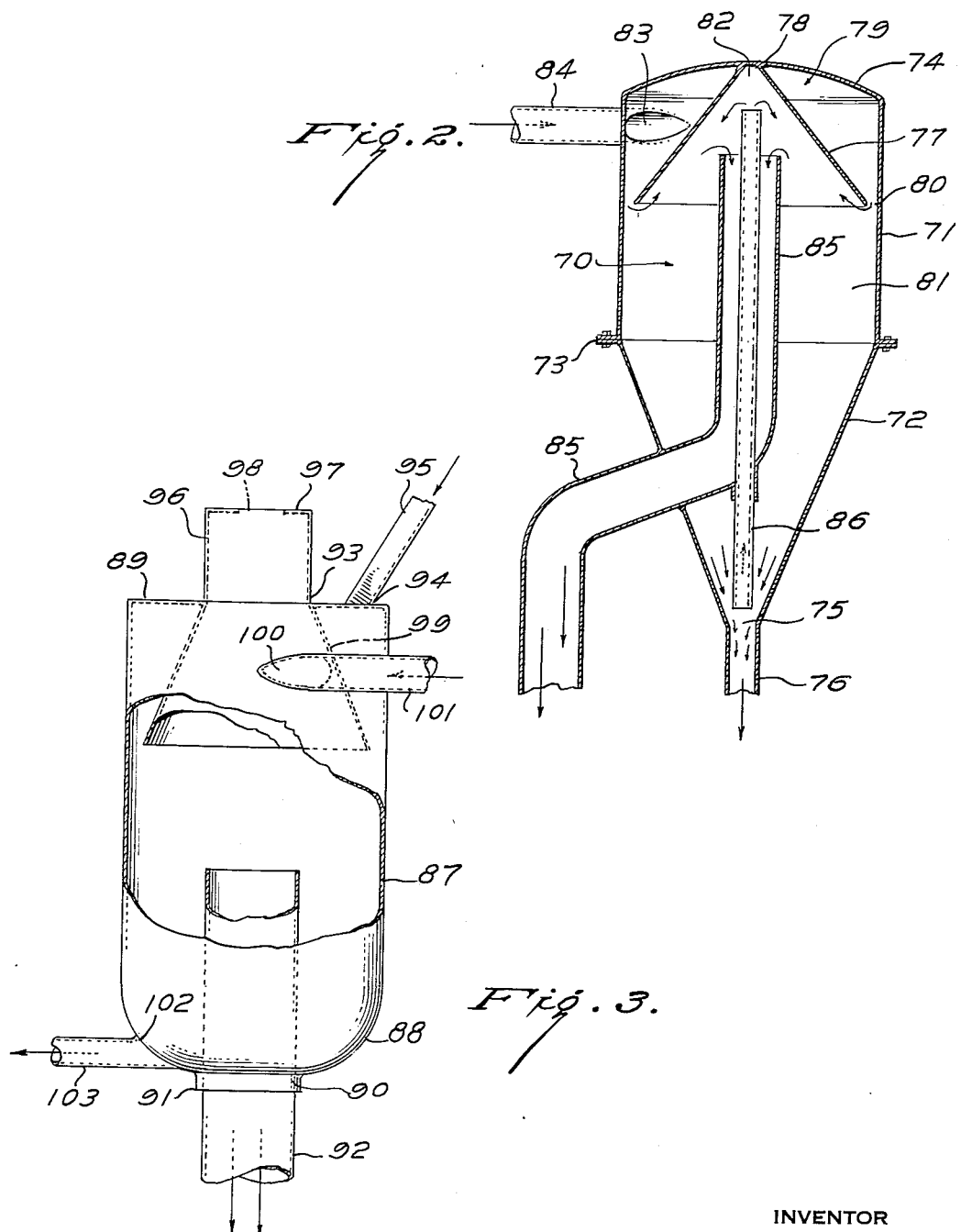
INVENTOR
VICTOR RAKOWSKY,
ATTORNEY

United States Patent Office 2,726,763
Patented Dec. 13, 1955

2,726,763

METHOD OF GRAVITY SEPARATION

Victor Rakowsky, Joplin, Mo.

Application August 14, 1951, Serial No. 241,725

6 Claims. (Cl. 209—172.5)

This invention relates to the separation of heterogeneous mixtures of solid particles into fractions which differ in specific gravity. As such, it contemplates an improved separatory system, utilizing novel process steps and equipment for making such separations. More specifically, the invention is concerned with a circuit capable of making such separations by treatment of the particulate mixture in a moving body of separatory fluid. Still more particularly, in accordance with the present invention, both a process and equipment flowscheme is provided whereby such separations are more quickly, easily and economically accomplished than was heretofore considered practicable or possible.

In recent years, industry, particularly in the minerals dressing fields, has shown a markedly increasing interest in processes and apparatus for separating a desired fraction of particles from a mixture thereof with a large bulk of other materials from which it is necessary that a separation be made. Industrial progress in this field has brought forth many different process and equipment improvements for such treatments.

A common feature of many such process and apparatus circuits is the immersion of the particulate mixture in a high-density fluid which accomplishes the separation. This fluid is selected to have a specific gravity such that one solids fraction will sink therethrough and another will float thereon. The heavier product fraction, which sinks, and the lighter, which floats, are separately collected; hence the common designation of many such systems as "sink-and-float" separations.

The separatory fluid may be a true liquid of heavy density. More commonly, it comprises a suspension of solid particles in a fluid, usually water. Various components may be dissolved in the water, if so desired. The suspended particles are sufficiently fine so that for all practical purposes the suspension acts as a true fluid. It is with such suspension-type fluids that the present invention is primarily concerned, i. e., with the types of process often designated as "heavy-media" separation. The separatory fluid is variously designated as such or as "separatory medium" or simply as "medium." Solids employed to make up medium are variously referred to as the separatory media, as medium solids, or simply as "media."

In various industrial proposals for separation using suspension-type separatory fluids, various medium solids have been used. In some cases they are simply crushed or powdered solids of sufficiently high density, such as barytes, galena, powdered copper or lead and the like. There must be some system of recovering and reusing the solids for economical operation. Attempts are made to free them from the very fine particles and slimes, with which they become associated, through settling, tabling, froth flotation, jigging and the like.

In more preferable types of operation, the medium solids used are capable of being magnetized. These include such materials as magnetite, ferrosilicon, crushed steel, grinding dust or roll scale fractions and the like, all of high magnetic permeability and remanence. They may be separated from accompanying solids, fines, slimes and water by magnetic separation; and after suitable demagnetization, are capable of being remade into separatory fluid for reuse. The present invention, insofar as the operating principles utilized are concerned, is adapted to use either a magnetic cleaning system or any other desired cleaning system.

In general, most previously-proposed processes may be classified into two types. In the first, a relatively very large body of separatory fluid is maintained substantially in hydraulic equilibrium. The materials to be separated are immersed therein. The fraction which sinks therethrough is collected and removed by some mechanical means such as a rake, drag, screw, airlift or the like. The lighter fraction, which rises to the top, is overflowed into a suitable launder. By use of suitable ancillary equipment, both fractions are drained of their accompanying liquid and part of the drainage medium is recycled; the residual separatory fluid is then washed off in some manner and the washing liquids are thickened and/or cleaned and their medium solids content is thereby recovered for reuse. Such systems have proved excellent in all operations where they can be used. Installations capable of handling tremendous quantities of solids have been and are being installed.

The other common classification of such separatory operations are those employing dynamic centrifugal forces greater than that of normal gravity. In such operations, mixtures of the particulate material and separatory fluid are released under high pressure into a constricted volume at a tangential angle thereto and caused to travel through said restricted volume at a high rate of flow and with a very high rate of rotation. The fluid must be forced through with sufficient velocity so that radial flow will be at such a high rate that an inverted vortex forms at the center of the body of fluid. The inverted vortex travels upwardly, carrying with it the lighter density fraction. The heavier density fraction follows down the walls of the constricting shell and is withdrawn together with fluid at the bottom. Such systems are also excellent where they can be used and large installations utilizing this principle have been and are being made.

There are a number of less common varieties of apparatus in use for these purposes. For example, there are some installations in which the separatory fluid is caused to flow over considerable distances substantially horizontally in superposed layers which travel at somewhat different rates of speed. In this way the distance at which particles of slightly different specific gravity reach the bottom of the several layers after travelling from the point of immersion is exaggerated; and an effective separation can be made. However, the fluid in each of the layers travels in substantially laminar flow and the separating forces are not greater than that of normal gravity.

All of these types of apparatus and flowschemes, as was noted, are capable of being used to great advantage. However, each of them suffers from one or more defects, some common to them all. These prevent the wider use of such processes and equipment. For example, in all such systems, a tremendous inventory of fluid in use must be maintained. Apparatus in the static or laminar flow types of operation are huge and take up tremendous amount of floor space. In the cyclone type separator, the actual separatory vessel itself is small, but an approximately equal, if not greater, amount of separatory fluid is used and the total equipment is substantially as bulky. Because of the large amount of fluid in use, ancillary equipment for handling it must also be large.

It is one of the objects of the present invention to cut down on the necessary inventory of separatory fluid in circulation, as well as the ancillary equipment required to maintain, reclaim and reuse the materials which make up the separatory fluid.

In addition, the static or laminar type flow of apparatus and process is not particularly well adapted to handle a wide size range of particulate material or mixtures which contain a preponderance of small particles. The economic efficiency of such operations begins to fall off at sizes below about minus 3/16" average particle diameter and falls off very rapidly for particles sizes averaging below about one tenth inch average diameter or smaller. They are not particularly well adapted for handling mixtures which contain large size pieces as well as the smaller particles.

On the other hand, the dynamic or cyclonic type of separator suffers from certain inherent limitations. Its maximum efficiency can only be utilized in the treatment of particulate mixtures which are small in size, on the order of magnitude of particle sizes which cannot be effectively handled in the static or laminar flow types of apparatus. One of the reasons for this is in the nature of the operation itself. It is necessary that the particles to be treated be admixed with the separatory fluid and the combination must be introduced into the separatory vessel under high pressure at high velocity. It is, therefore, a further object of the present invention to devise a separatory system which is not limited in this respect.

In general, these objects have been easily and surprisingly and effectively accomplished by the novel flow circuit of the present invention. The flow system of this circuit, together with several of the pieces of apparatus used therein, is highly novel. In this respect, attention is called to my copending application, Serial No. 241,721 filed of even date, which discloses a novel separatory vessel. Further, in my copending application, Serial No. 241,723, also filed of even date, is disclosed a novel thickening element. The circuit of the present invention utilizes, preferably, apparatus of both these types. In addition, a novel feature is found in the method of handling the wash waters and similar dilute flows containing separatory medium.

Further discussion of the operation of the present invention may be more readily followed by reference to the accompanying drawings, in which:

Figure 1 shows a diagrammatic flowscheme, utilizing a novel material handling circuit in accordance with the present invention and, preferably, utilizing separatory and thickening devices operating on the principles involved in the apparatus shown in Figures 2 and 3;

Figure 2 shows an elevation, partly in section, of an apparatus embodying the principal features of the method of thickening which forms the subject matter of my above-noted copending application Serial No. 241,723; and Figure 3 shows an elevation, partly in section, of an apparatus embodying the principal features of the separation process, the principal features of which form the subject matter of my above-noted copending application Serial No. 241,721.

The flowscheme of Figure 1 will first be discussed. This will be followed by a discussion of the principles utilized in the preferred forms of separating and thickening devices used in the flowscheme of Figure 1.

As seen in Figure 1, the process may be considered as starting with a suitable source of feed solids to be treated. Ordinarily, this will be storage bin 1, or its equivalent, containing a supply of crushed ore. Ordinarily, the ore will be crushed to sufficiently fine particle sizes to unlock the desired mineral values. For illustrative purposes of this discussion, it will be assumed that the ore in bin 1 has been crushed to minus 2" in size and contains all the smaller particles of the full size range.

Ore from bin or hopper 1 is ordinarily passed directly to a preliminary separator 2. However, as shown by the dotted flow line, for some ores this preliminary separator can be by-passed. In this discussion, it will be by-passed for the present and further discussed below.

Accordingly, then, ore from hopper 1 will be now considered as passing directly into the feed chute of separator 3. The operating principles of this separator will also be discussed below. Separatory fluid is introduced near the top of primary separator 3, through the side arm conduit 4. The concentrate of more dense particles is removed near the bottom of separator 3 through a conduit 5 connected to an airlift 6, by which the slurry is raised above and flows onto a drainage screen 7. Fluid drained from these solids passes into a catchbasin 8 and is removed through conduit 9. Solids retained on screen 7 pass onto washing screen 10, on which they are washed free of separatory fluid by water sprays 11. The washed, heavy-density product is removed from the system at 12. Underflow from screen 10 is collected in catchbasin 13 and drawn off through conduit 14.

A concentrate of less-dense materials flows directly from the bottom of separator 3 onto another drainage screen 15. Screen oversize passes down onto washing screen 16 and is washed free of separatory fluid by means of sprays 17. Drainage-screen underflow is caught in a suitable catchbasin 18 and removed through conduit 19. The washing screen underflow is caught in catchbasin 20 and withdrawn through conduit 21. Fluid-free product solids are removed from screen 16 at 22.

Two product fractions will be seen to have been removed, at points 12 and 22. These correspond to the "heavy" and "light" fractions, respectively, obtained in the operation of "sink-and-float" separations or "heavy media" separations of conventional types.

The various screen underflows carried in conduits 9, 14, 19 and 21 must be treated by some suitable system to recover and reuse their medium solids content. The drainage-screen underflows are ordinarily sufficiently clean and sufficiently concentrated to be reused substantially directly. The more dilute, washing-screen underflows carried in conduits 14 and 21 ordinarily require the use of some cleaning and concentrating system. One such system is employed in the flowscheme of the present invention.

Since the drainage-screen underflows in conduits 9 and 19 can be directly reused, they are passed into a suitable return medium supply tank 23. For reasons which will be subsequently brought out, some diluent fluid will be required in tank 23. As shown in Figure 1, this can be supplied in several manners. Additional water or a dilute medium from some extraneous source may be added through conduit 24. If so desired, the flow of fluid in conduit 21 may be divided, as by flow divider 26, and a portion of the washing-screen underflow may be carried through conduit 27 into tank 23. The supply of separatory fluid for separator 3 is connected from tank 23 through conduit 28, pump 29 and conduit 30 into the medium inlet 4.

The remainder of the washing-screen underflow fluid from screen 16, together with that from screen 10, is delivered by conduits 14 and 31 to a suitable pump 32 and from there through a preliminary thickener 33. Thickener 33 may be of any desired type or design. For example, it may be a conventional "Dorr" thickener or any of its mechanical equivalents. On the other hand, it may be a thickener of the type shown in my copending application Serial No. 241,723 noted above. Thickened slurry from this treatment is removed by conduit 34 through a suitable pump 35, conduit 36, flow divider 37 and conduit 38 into the inlet side arm of a secondary thickener 40. The thin excess liquid from thickener 33 is drawn off through conduit 41 and passes to waste and/or reuse.

Thickened slurry from the bottom discharge or thickener 40 will be sufficiently dense and ordinarily will be sufficiently clean to be directly recycled as makeup medium. It is therefore taken by conduit 42 directly back to tank 23. Since this thickened concentrate of medium solids will be normally more dense than required for direct recycling as separatory fluid, it will require dilution. Part of this is accomplished by the drainage medium which is introduced into tank 23, since the drainage medium will drop slightly in density, due to use. The remainder is that diluent fluid which is brought into tank 23 through conduit 27 and/or 24, as was noted above.

The thin discharge from thickener 40, through side arm 43, will be impoverished of medium solids. It is taken through conduit 44 to a suitable flow divider 45. From there, a portion is diverted through conduit 46 and, with fluid from flow divider 37 through conduit 47, is conducted as separatory fluid for preliminary separator 2 into fluid tank 48. The remainder of the fluid from flow divider 45 is carried through conduit 49 to a suitable magnetic-thickener-cleaner system 50. From the magnetic thickener-cleaner, the medium solids-free liquid is taken through conduit 51 to waste. Normally, this will be to some large settling pond where the slimes and fines are gradually settled out and the water clarified for reuse.

Magnetic concentrate from thickener-cleaner 50 is carried out through conduit 52 to a suitable receiving tank through flow divider 53. From this flow divider, a sufficient amount is diverted to tank 48 to make up the necessary density for the fluid to be used in preliminary separator 2. The remainder is passed to a clean-medium storage tank 54, through conduit 55.

Since the use of the separator in accordance with the present invention involves the use of forces greater than normal gravity, the extent to which the medium solids are magnetized is, ordinarily, of little importance. However, it may be desirable to demagnetize solids recovered from the thickener-cleaner system 50. This may be done wholly or completely by varying the alternating current through demagnetizing coil 56, located around a section of conduit 52.

From tank 54, makeup fluid is drawn by suitable pump 57 and returned through conduit 58 to inlet side arm 4 of separator 3. Alternatively, if tank 54 is located at a suitable elevation, the recovered solids may be taken therefrom by gravity flow into tank 23 by a suitable conduit. When this can be done, it eliminates the necessity for the extra pump 57 which is shown in the flowscheme.

Returning to the operation of preliminary separator 2, it should be noted that the latter is operated somewhat differently than primary separator 3. In the latter case, the inlet separatory fluid density is adjusted to a value at which the resultant light and heavy discharges constitute the desired products solids fractions. Preliminary separator 2, however, is operated on a principle differing in that both the solids fractions, which constitute the light and heavy fractions produced in separator 3, are carried in the heavy product from the preliminary concentrator.

This is done by operating at a much lower separating fluid density than normal for a sink and float or heavy media separation. Separatory fluid of a suitably low density is taken from storage tank 48 into the side arm fluid inlet 59 of preliminary separator 2. The whole ore is introduced at the top of separator 2 from storage bin 1. The whole ore will contain fines small enough to form permanent slimes. In addition, it will usually contain amounts of larger but low-density solids comparatively free from higher-density inclusions. The separation density in the preliminary separator is so chosen that substantially all of both the normal sink and float products will be collected in the preliminary heavy concentrate, much of the slimes and low-density solids being eliminated.

This preliminary, heavy fraction contains (1) the normal sink product, (2) the normal float product, which in this operation constitutes middlings, and (3) some of the larger-sized, low-density solids. The preliminary heavy fraction, drawn off through lower side arm 69, as passed as solids feed directly to primary separator 3, as shown.

The residual low-density solids, together with fines and slimes, are discharged from the bottom of the preliminary separator onto a suitable drainage screen 60. Screen-oversize flows onto a washing screen 61 on which it is washed free of separatory fluid by water sprays 62. Washing screen-oversize, free of medium solids, fines and slimes, are collected as a concentrate of mineral values. If gangue, they are discarded.

Screen undersizes from screens 60 and 61 are caught in suitable catchbasins 62 and 63 and carried through conduits 64 to a suitable flow divider 65. Thus fluid, in addition to fines and slimes, will ordinarily contain considerable quantities of medium solids. If not, it can be discharged to waste at 60. If it contains medium solids, the flow is divided at 65 and a part is sent as diluent fluid through conduits 67 and 46 into tank 48. The remainder is carried down through conduit 68 into the feed to pump 32 and thence through the remainder of the thickening and cleaning system.

In some cases, it will be found that the efficiency of operation of thickener 40 is so great that preliminary thickener 33 may be eliminated. If so, fluid from pump 32 is passed directly into the inlet thickener 40, as shown by the dotted line at 69.

As shown in the general flowscheme of Figure 1, both a novel separator and a novel thickener are preferably employed. Both operate on principles differing from those of conventional separators and thickeners. As noted above, the separating process and thickening process principles form the subject matters of my copending applications, Serial Nos. 241,721 and 241,723. Both will be considered in the following discussion as applicable to the overall circuit of this invention.

As illustrative thickener, utilizing these novel principles, is shown in Figure 2. It should be noted that the particular shape or configuration of the thickener vessel is immaterial so long as provisions are made for accomplishing certain necessary operations therein.

In modification shown in Figure 2, a cylindrical space, generically designated as 70, is enclosed by a cylindrical upper section 71 and a lower conical section 72. The larger diameter of conical section 72 is joined to the lower end of cylindrical section 71, as at 73, by some suitable means, such as bolting, riveting, welding or the like. At the top, the vessel is enclosed by a suitable coverplate or dome 74. The lower end, at the apex of conical section 72, comprises an orifice 75 opening into discharge conduit 76. A conical baffle 77, the apex or smaller diameter or which is attached to the center of cover 74, as at 78, extends downwardly into space 70 within cylindrical section 71. Baffle 77 flares outwardly and downwardly to a larger diameter approximating that of the inner diameter of cylindrical section 71.

In effect, baffle 77 divides enclosed space 70 into an upper annular zone 79 in open communication through an annular port 80 with a lower and larger cylindrical zone 81 which includes space 82 inside and under baffle 77.

Near the top of the cylindrical section 71 and above the lower edge of conical baffle 77, the wall of the enclosing cylinder 71 is pierced by a port 83. Outside the tank is a fluid inlet conduit 84 joined to the side wall of section 71 about the outer edge of port 83. Preferably, but not necessarily, port 83 should be so shaped that fluid entering through conduit 84 and port 83 enters space 79 tangentially to the outer wall.

Centrally located inside the vessel is a central discharge conduit 85, which extends centrally down through the vessel from a level under and within baffle 77 to a lower level in the conical section 72, passing out through the wall of section 72 at a level above orifice 75. Conduit 85 extends to any desired point outside the vessel for the delivery of fluid flowing outwardly therethrough. A conduit 86 extends from a level just above orifice 75 centrally up through the vessel, into conduit 85 and concentrically up through conduit 85 to a level under baffle 77 appreciably above the end of conduit 85.

The operating principle of the thickener is believed to be explainable in the following way. Slurry to be treated is introduced into the thickener through conduit 84 at port 83. Due to its direction of delivery it moves around and down through annular space 79 in a spirally-flowing mass. As it passes down through annular space 79 it is flowing through areas of constantly and progressively decreasing area. As a result of the compressing effect of baffle 77, in so decreasing the area, this produces a resultant increase in the intrinsic fluid velocity. Due to the action of the resultant increasing centrifugal and centripetal forces, (a) the lighter solids in the slurry tend to accumulate on or near and travel down the surface of baffle 77 and (b) the heavier solids tend to accumulate at or near the vertical outer wall of the cylindrical section.

As a result of the sudden pressure release in passing through annular port 80 into open space 81, fluid flows back up into space 82 and carries with it a major portion of the lighter solids. This fraction will include also a major portion of the liquid. In appearance, this flow resembles an inverted whirlpool with a central vortex which is allowed to discharge down through the central conduit 85 and out of the vessel, preferably by free fall. The action of the whirlpool under baffle 77 creates a very appreciable vacuum in space 82 above the fluid surface The remainder of the fluid and heavier solids continues on down through space 81 into the conical section 72. As a result of the restricting of the walls of conical section 72, velocity again increases. Again the tendency of a decreasing density differential to develop between the outer wall and the center of the vessel becomes noticeable. Fluid continues to move spirally downward through the conical section to the discharge port 75. Vacuum in space 82 draws a large fraction of additional fluid and lighter solids from the central lower density zone just above port 75 up through conduit 86 into space 82, where it is discharged and flows out through the central conduit 85. The remaining fluid, which will be but a fraction of the liquid entering the thickener through conduit 84 will contain substantially only the heaviest of the solids. These will comprise a substantial proportion of the medium solids when a thickener of this type is used in the circuit of Figure 1. In addition, because of the repeated low-density withdrawals, substantially all the lighter solids will have been removed from the medium. In this way, not only is the concentrate highly thickened, but it will contain a substantial proportion of and substantially only medium solids in a highly cleaned condition. As shown in Figure 1, these are passed directly to tank 23 for reuse after suitable mixing, and, if necessary, dilution.

An illustrative separator, utilizing the novel principles of the present invention, is shown in Figure 3. Again, it should be noted that the particular shape or configuration of the separator vessel is immaterial so long as provisions are made for accomplishing certain necessary operations therein.

In the modification shown in Figure 3, there is an outer cylindrical shell 87 having a curved bottom 88 and a coverplate 89. The bottom is pierced by a large central port 90 surrounded by a suitable collar 91, whereby a central conduit 92 fills and is supported in the port 90. Conduit 92 extends from a level well within the enclosed space out through the bottom of the vessel to any desired point for the delivery of the discharge therethrough.

Coverplate 89 contains a large central opening 93. A small opening to one side thereof is indicated at 94. A feed chute for the delivery of solids to be treated enters and fills port 94, normally being attached about the edges of port 94. Extending upwardly from the central opening 93 and unitarily attached about the edge thereof is a vertical cylindrical section 96, the top of which is closed partially by plate 97 having a central opening 98 for the free admission of air into the apparatus.

Dependent from coverplate 89 is a conical baffle 99 which is shown in Figure 3 as dependent from and attached to the edges of opening 93. However, the upper part of baffle 99, if so desired, may be attached at any centrally positioned spot of the annular plate 89. Baffle 99 extends down into the enclosed space for a considerable distance but ends at a height appreciably above the inlet to conduit 92.

The vertical wall of cylindrical section 87, near its top edge and alongside baffle 99, is pierced by a suitable port 100. Outside the vessel, a separatory medium delivery conduit 101 is attached unitarily about the edges of port 100. Preferably, but not necessarily, the position of conduit 101 and the shape of port 100 is such that fluid is delivered into the separator in a direction tangential to the outer walls of the separator.

The bottom of the separator is also pierced near one edge by a port 102. A fluid discharge conduit 103 is attached to the outer surface of the vessel about this port. Again preferably, but not necessarily, open port 102 is tangential to the surface of the vessel.

It is believed that the beneficial action of the separator can be explained in the following way. Incoming fluid, due to its point and direction of delivery, moves tangentially around and down through the annular space between the outer wall of baffle 99 and the inner wall of cylinder 87. Solids entering through port 94 from chute 95 are immersed in this flowing liquid. Due to its rotational velocity and the laminar flow therein, the lighter density solids tend to accumulate at or on the outer surface of baffle 99 and the heavier or more dense solids tend to accumulate at or near the inner wall of cylinder 87. As flowing fluid passes below the edge of baffle 99, there is, in effect, a sudden pressure release. As a result, fluid rises up inside baffle 99, usually to some height within the upper cylinder 96 and forms into a fluid funnel extending from the top of this rise down into the opening at the top of conduit 92. The lighter solids, which tend to accumulate near baffle 99, are drawn up into this flow and are discharged with the liquid down through conduit 92. At the same time, lighter solids thrown toward the center of the vessel by the continued action of the spirally-moving fluid are also taken out through this central conduit.

Remaining fluid and solids pass down into the annular space between the walls of cylindrical section 87 and the central conduit 92. Continuing to move in a spiral direction, these fluids, with their accompanying solids, are forced out through port 102 and into conduit 103.

In order to maintain separatory conditions within the vessel, the rate of flow out through conduit 103 must be controlled. This may be done in any desired manner, as by simple throttling, by discharging conduit 103 into a suitable airlift or siphon, which raises the discharge to a height in equilibrium with the fluid height within the vessel, or mechanical equivalents of these expedients. So long as a provision for control is made, its exact mode is immaterial in the present invention. Again, it should be noted that so long as the functions accomplished by the separator can be carried out, the exact structure thereof is not concerned as a part of the present invention.

With reference to Figure 1, one additional feature should be noted. The heavy discharge fraction from separator 3 may contain some non-magnetic screen undersizes of quite high density. In such cases, they may slowly accumulate in the recycled thickened discharge from thickener 40 if no provision is made for their removal. Accordingly an optional flow is shown. Fluid may be either continuously bled or periodically discharged, if necessary, through conduits 104 and 49 to the cleaning system. In this way, where necessary, these fine, non-magnetic solids will pass through conduit 51 and leave the system. Such solids, if fine enough to be present in the lighter discharge fraction from separator 3, will be taken eventually through conduit 31 and thickener 33 to thickener-separator 40 and reporting in either the light or heavy discharge, but being eventually removed either through conduit 43 or 104.

An alternate flow is shown on Figure 1 at 105. As indicated previously, since the invention involves forces greater than normal gravity, the extent to which the medium solids are magnetized is, ordinarily, of little importance. Should it be deemed unnecessary to demagnetize the solids recovered from system 50, they may be conducted through conduit 105 to conduit 55 where the flow may be divided between tanks 48 and 54.

I claim:

1. A continuous process of separating particulate solid mixtures into fractions of differing specific gravity respectively higher and lower than a selected parting density which comprises: causing a separating medium to flow into and spirally around and down within a horizontally confined space at a sufficiently angular velocity to create an open downward free vortex; discharging the fluid flow concentric with and including the open vortex center, downwardly and out of the confined space; causing the remaining flow to continue around and down within said space discharging said remaining flow from a level below that of said vortex discharge; introducing the solids mixture into said confined flowing fluid at a point above said vortex discharge; adjusting the volume of fluid discharged from said lower level and adjusting the total volume of incoming fluid whereby the desired heavy fraction of higher density solids is removed from the lower level and the remaining solids are removed as a lighter fraction with said vortex discharge; collecting and separately subjecting each fraction to drainage and washing; collecting and combining the drainage underflow from each fraction and recycling it; collecting and combining the washing underflow from each fraction and subjecting it to a cleaning and concentrating operation comprising, establishing a spiral laminar flow of said underflow within a confined space; causing said spiral flow to move downward through said confined space; dividing the downward movement into a confined central flow and an annular flow; continuing the confined central flow downward through and at a lower level out of said confined space; continuing the annular flow downward at increasing angular velocities through a zone of decreasing cross-sectional area to a level below that of the central flow discharge; discharging the annular flow at a low level in the confined space; creating a vacuumized space in the upper portion of the confined space by maintaining the rates of flow into and out of said confined space sufficiently high to form and maintain a central vortex opening downward from a level high in the confined space to a level within the confined central flow, utilizing the resultant vacuum to draw fluid from adjacent the annular flow discharge back into the open vacuumized space; adjusting the rate of input and the rate of annular flow discharge to produce the desired density of the said annular flow discharge fraction; and collecting both the annular flow discharge fraction and the confined central flow discharge; combining the annular flow discharge fraction with the combined drainage underflow; subjecting the central discharge fraction to a magnetic thickening and recycling the magnetic concentrate.

2. A process as in claim 1 in which the magnetic concentrate is demagnetized prior to recycling.

3. A process as in claim 1 in which the recycled magnetic concentrate is divided between the primary separation step and a preliminary separation step to which the mixture is initially subjected.

4. A process as in claim 1 in which the combined washing underflow is treated to a preliminary thickening prior to the primary concentration operation.

5. A separatory system for continuously separating particulate solid mixtures into fractions of differing specific gravities, respectively higher and lower than a selected parting density comprising: a separatory device having a first tubular element defining a confined space; means for introducing fluid medium into an upper level of said confined space; means for introducing a mixture of particulate solids into an upper level of said confined space; a second tubular element extending from without up and into said confined space; said second tubular element having one end thereof open to said confined space at the horizontal center and at an intermediate level thereof for discharging a solids fraction; said tubular elements defining a lower annular zone; a discharge conduit connected with said zone at a lower level thereof for discharging a second solids fraction; means for collecting each fraction; means for separately draining and washing each fraction; means for combining and recycling the drainage underflows; means for subjecting the washing underflows to a concentrating action in a thickening device comprising a tubular shell enclosure having an upper tubular section enclosing a first zone; a cover plate closing the upper end of said section; a lower inverted pyramidal section defining a second zone; a feed means communicating with the upper levels in said shell enclosure; a discharge port for discharging a thickened fraction near the smaller and lower end of said pyramidal section; a tubular element extending up and into said enclosure and communicating therewith at the vertical center thereof for discharging a second fraction; means for collecting the fractions; conduit means for recycling the thickened fraction with said combined drainage underflow; a magnetic thickener for thickening the second fraction and a conduit for recycling the resultant magnetic concentrate.

6. A system as in claim 5 in which the conduit for recycling the magnetic concentrate is provided with means for demagnetizing the solids.

References Cited in the file of this patent

UNITED STATES PATENTS

| | | |
|---|---|---|
| 1,301,544 | Crombie | Apr. 22, 1919 |
| 2,206,980 | Wade | July 9, 1940 |
| 2,325,149 | Rakowsky et al. | July 27, 1943 |
| 2,387,866 | Walker | Oct. 30, 1945 |
| 2,496,590 | Marsh | Feb. 7, 1950 |

OTHER REFERENCES

Rock Products, vol. 53, #11, p. 53, November 1950. (Copy in Division 55.)